United States Patent [19]

Rademacher et al.

[11] Patent Number: 5,855,964
[45] Date of Patent: Jan. 5, 1999

[54] POWDER CLEARCOAT AND PROCESS FOR THE PRODUCTION OF A MULTICOAT FINISH

[75] Inventors: Josef Rademacher, Münster; Udo Reiter, Telgte, both of Germany

[73] Assignee: BASF Lacke + Farben, AG, Muenster-Hiltrup, Germany

[21] Appl. No.: 428,166

[22] PCT Filed: Oct. 29, 1993

[86] PCT No.: PCT/EP93/02964

§ 371 Date: May 22, 1995

§ 102(e) Date: May 22, 1995

[87] PCT Pub. No.: WO94/09915

PCT Pub. Date: May 11, 1994

[30] Foreign Application Priority Data

Nov. 3, 1992 [DE] Germany ............ 42 37 032.9

[51] Int. Cl.$^6$ ................ B05D 1/04; B05D 1/06
[52] U.S. Cl. ............ 427/475; 427/482; 427/485; 427/486
[58] Field of Search ............ 427/195, 287, 427/458, 485, 475, 482, 486; 523/220–223; 428/220, 335, 461, 463; 524/94–102

[56] References Cited

U.S. PATENT DOCUMENTS

| | | | |
|---|---|---|---|
| 3,953,644 | 4/1976 | Camelon et al. ............ | 428/220 |
| 4,027,066 | 5/1977 | Victorius ............ | 428/334 |
| 4,027,366 | 6/1977 | Millar et al. ............ | 428/623 |
| 4,057,607 | 11/1977 | Soehngen et al. . | |
| 4,689,241 | 8/1987 | Richart et al. ............ | 427/28 |
| 5,173,326 | 12/1992 | Krämer ............ | 427/478 |
| 5,206,108 | 4/1993 | Felder et al. ............ | 430/137 |
| 5,552,191 | 9/1996 | Horinka et al. ............ | 427/475 |

FOREIGN PATENT DOCUMENTS

| | | | |
|---|---|---|---|
| 2012191 | 12/1978 | United Kingdom ............ | B05D 1/36 |
| 2 012 191 | 7/1979 | United Kingdom . | |

OTHER PUBLICATIONS

"Powder Particle Size Matters", Products Finishing Magazine, by D.S. Tyler, 54 (4), Jan. 1990, pp. 1–8.

"The Particle Size Distribution of Power Coating: The Feature of Quality", Hosokawa Micropul Article by K.H. Schwamborn, May 15–16, 1990, 24 pages.

Derwent, Sealing pipes using cyanoacrylate–diimethacrylate composition, one pg. No date avail.

*Primary Examiner*—Shrive Beck
*Assistant Examiner*—Fred J. Parker

[57] ABSTRACT

The invention relates to a process for the production of a multicoat finish, in which a pigmented basecoat is applied, dried and coated over with a powder clearcoat, and subsequently basecoat and powder clearcoat are stoved together. The invention is characterized in that the powder clearcoat employed has a particle size distribution in which a) no more than 15% by weight of the powder clearcoat particles have a particle size smaller than 10 $\mu$m;

b) for at least 40% by weight of the powder clearcoat particles the common logarithm of the quotient of the largest and the smallest particle size is less than or equal to 0.25; and c) at least 98% by weight of the powder clearcoat particles have a particle size smaller than 100 $\mu$m.

8 Claims, 1 Drawing Sheet

POWDER CLEARCOAT AND PROCESS FOR THE PRODUCTION OF A MULTICOAT FINISH

BACKGROUND OF THE INVENTION

1. Field of the Invention

The invention relates to a process for the production of a multicoat finish on a substrate surface, in which (1) a pigmented basecoat is applied to the substrate surface, (2) a polymer film is formed from the coating applied in step (1), (3) a powder clearcoat is applied to the resulting basecoat, and subsequently (4) the basecoat is stoved together with the powder clearcoat.

2. Description of the Prior Art

The invention also relates to powder clearcoats which are suitable for this process.

The process described above is known. It is employed in particular for the production of automotive topcoats, in particular for the production of metallic finishes (cf. eg. DE-A-38 14 853, U.S. Pat. No. 3,953,644, EP-A-299 420 (in particular page 5, line 22/23), U.S. Pat. No. 4,402,983, EP-A-45 040 and GB-A-20 12 191).

It is desirable for economic and ecological reasons to employ powder clearcoats in step (3) of the basecoat/clearcoat process described above. When powder clearcoats are used, the clearcoats obtained are in need of improvement, in particular with regard to gloss and leveling.

SUMMARY OF THE INVENTION

The object on which the present invention is based consists in the provision of a process of the type described above with which the finishes which can be obtained are improved with regard to the finishes of the prior art. The finishes should be improved in particular with regard to the gloss and leveling of the stoved clearcoat.

This object is surprisingly achieved in that, in step (3) of the basecoat/clearcoat process described above, a powder clearcoat is employed which has a particle size distribution in which a) no more than 15% by weight of the powder clearcoat particles have a particle size smaller than 10 μm;

b) for at least 40% by weight of the powder clearcoat particles the common logarithm of the quotient of the largest and the smallest particle size is less than or equal to 0.25; and c) at least 98% by weight of the powder clearcoat particles have a particle size smaller than 100 μm.

DESCRIPTION OF THE PREFERRED EMBODIMENTS

Figure 1:
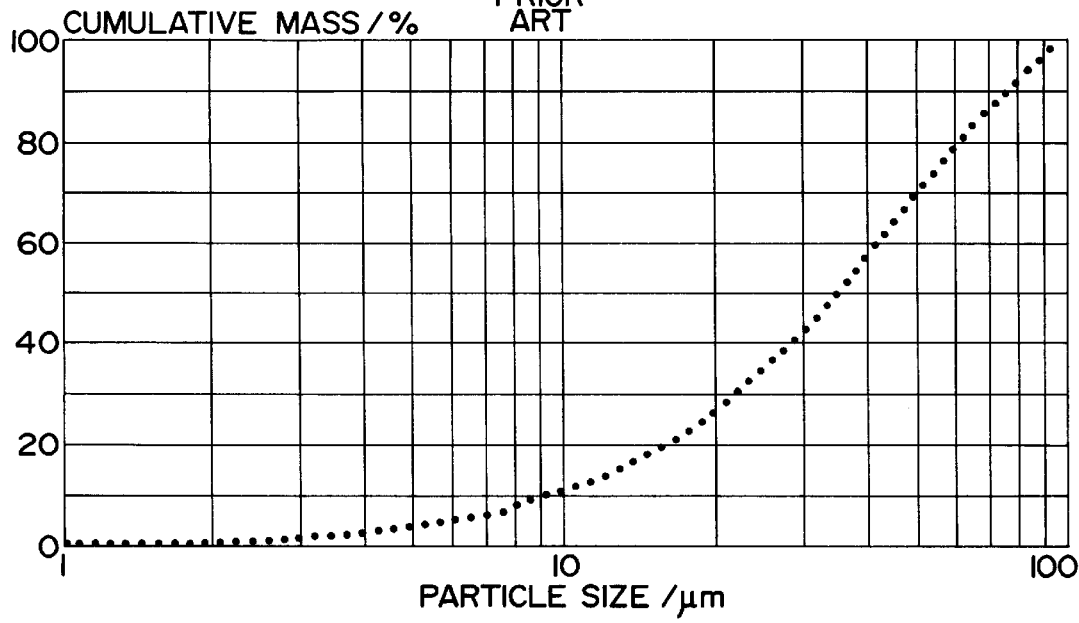
FIG. 1 illustrates the particle size distribution of a prior art clearcoat as described in Example 1.

In step (1) of the process, it is in principle possible to employ all pigmented basecoats which are suitable for the production of multicoat finishes. Such basecoats are well known to those skilled in the art. Both water-dilutable basecoats and basecoats based on organic solvents can be employed. Suitable basecoats are described in, for example, U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100.

In step (2) of the process, the solvents or the water are/is removed in a flash-off phase from the basecoat applied in step (1). The basecoat can also be stoved. However, this is disadvantageous on economic grounds, since in this case two stoving procedures instead of one are required to produce the multicoat finish.

In step (3), the powder clearcoat is preferably applied electrostatically. It is in principle possible to employ all powder clearcoats suitable for the production of multicoat finishes. Such powder clearcoats are well known. Suitable powder clearcoats are described in, for example, DE-A-38 14 853, GB-A-20 12 191, U.S. Pat. No. 3,953,644, DE-A-23 03 650, EP-A-299 420, U.S. Pat. No. 4,402,983 and EP-A-45 040.

It is essential to the invention that the powder clearcoat employed in step (3) has a particle size distribution in which a) not more than 15% by weight, preferably not more than 10% by weight, of the powder clearcoat particles have a particle size smaller than 10 μm;

b) for at least 40% by weight, preferably for at least 50% by weight and particularly preferably for at least 60% by weight of the powder clearcoat particles, the common logarithm of the quotient of the largest and the smallest particle size is less than or equal to 0.25, preferably less than or equal to 0.20 and particularly preferably less than or equal to 0.15; and c) at least 98% by weight, preferably at least 99% by weight, of the powder clearcoat particles have a particle size smaller than 100 μm.

It is preferred for the average particle size of the powder clearcoat particles mentioned in b) (in other words, those powder clearcoat particles which fulfill the condition that the common logarithm of the quotient of the largest and smallest particle size is less than or equal to 0.25, preferably less than or equal to 0.20 and particularly preferably less than or equal to 0.15) to be d±0.2 d, preferably d±0.1 d, where d represents the average layer thickness of the stoved powder clearcoat layer which is to be prepared using the powder clearcoat, and the average particle size is determined using a laser diffraction spectrometer.

The powder clearcoats can be adjusted to the particle size distribution in accordance with the invention with the aid of commercially available milling units, with the optional assistance of screening machines and/or (cyclone) classifiers. Suitable machines are known to those skilled in the art and are commercially available from, for example: Alpine AG, Augsburg (FRG) and Hosokawa Micropul, Cologne (FRG). The invention is illustrated in more detail in the following examples. All parts and percentages are by weight, unless expressly stated otherwise.

1. Preparation of a prior art powder clearcoat 69.7 parts by weight of a saturated polyester containing hydroxyl groups (Uralac® P 2115; manufacturer: DSM Resins; melt viscosity at 165° C.: 500 dPas; OH number: 40), 25.0 parts by weight of a polyisocyanate based on isophorone diisocyanate and masked with ε-caprolactam (Vestagon® B 1065; manufacturer: Hüls AG; NCO content:

10.5% by weight), 0.5 part by weight of an oligomeric butyl acrylate (Acronal 4F, manufacturer: BASF AG), 2.6 parts by weight of Tinuvin 900 (Ciba Geigy; UV absorber), 1.4 parts by weight of Tinuvin 144 (Ciba Geigy; HALS) and, as degassing agent, 0.8 part by weight of benzoin are mixed and melt-homogenized at from 110° to 120° C. in an extruder. The extrudate is cooled rapidly and comminuted to give chips having a diameter of not more than 3 cm. These chips are ground to a powder in a classifier mill. The particle size distribution of the resulting powder clearcoat is shown in FIG. 1.

2. Preparation of a powder clearcoat according to the invention

Figure 2:
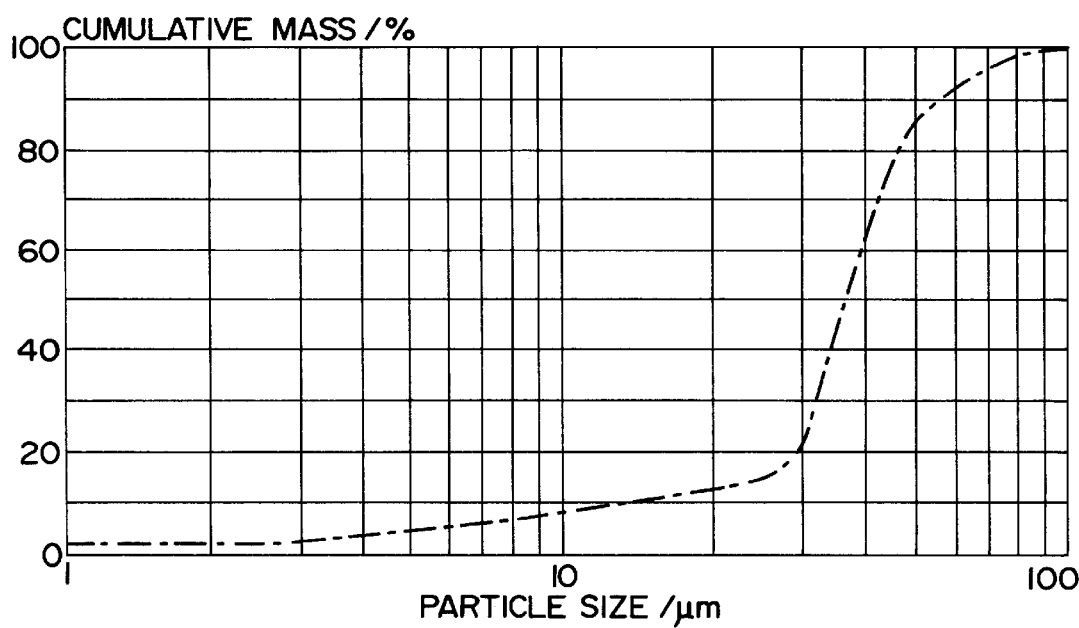
FIG. 2 illustrates a particle size distribution of a clearcoat according to the present invention as described in Example 2.

The procedure as described under 1. is followed, the only exception being that the chips are ground to give a powder clearcoat having a particle size distribution as shown in FIG. 2.

3. Production of metallic finishes

A commercially available, water-dilutable basecoat containing polyurethane, polyester and melamine resin and pigmented with aluminum flakes is applied to phosphated steel panels coated with a commercially available electrodeposition coating and a commercially available filler such that a dry film thickness of from 12 to 15 μm is obtained. The applied basecoat is dried for 10 minutes at room temperature and for 10 minutes at 80° C. The powder clearcoats prepared according to sections 1. and 2. are then applied electrostatically to give a film thickness of from 40 to 50 μm. Finally, basecoat and powder clearcoat are stoved for 20 minutes at 180° C. (panel temperature). The metallic finish produced using the powder clearcoat prepared according to section 2. indicates a distinctly improved leveling in comparison to the metallic finish produced using the powder clearcoat prepared according to section 1. In the profilometric measurement of the clearcoat surfaces, a peak-to-valley height $R_a$ of 0.36 μm with a standard deviation of 0.14 μm is measured for the finish produced using the powder clearcoat according to section 1, whereas, for the finish produced using the powder clearcoat according to section 2, in accordance with the invention, a peak-to-valley height of only 0.14 μm with a standard deviation of only 0.01 μm is measured. The improved evenness of surface achieved using the powder clearcoat according to the invention is also clearly visible to the eye.

We claim:

1. Powder clearcoat, comprising powder clearcoat particles having a particle size distribution in which
   a) no more than 10% by weight of the powder clearcoat particles have a particle size smaller than 10 microns;
   b) for at least 50% by weight of the powder clearcoat particles the common logarithm of the quotient of the largest and the smallest particle size is less than or equal to 0.20; and
   c) at least 98% by weight of the powder clearcoat particles have a particle size smaller than 100 microns, and in which the average particle size of the powder clearcoat particles is d±0.2 d, where d represents the average layer thickness of the stoved powder clearcoat layer to be prepared using the powder clearcoat, wherein the average particle size is determined using a laser diffraction spectrometer.

2. Powder clearcoat according to claim 1, wherein for at least 60% by weight, of the powder clearcoat particles, the common logarithm of the quotients of the largest and the smallest particle size is less than or equal to 0.20.

3. Powder clearcoat according to claim 1, wherein for at least 40% by weight of the powder clearcoat particles, the common logarithm of the quotient of the largest and the smallest particle size is less than or equal to 0.15.

4. Powder clearcoat according to claim 1, wherein at least 99% by weight of the powder clearcoat particles have a particle size smaller than 100 microns.

5. Process for the production of a multicoat finish on a substrate surface, comprising
   (1) applying a pigmented basecoat to the substrate surface,
   (2) forming a polymer film from the basecoat applied in step (1),
   (3) applying a powder clearcoat to the resulting basecoat, and subsequently
   (4) stoving together the basecoat and the powder clearcoat, wherein the powder clearcoat employed in step (3) is a powder clearcoat according to claim 1.

6. Powder clearcoat according to claim 1, wherein the common logarithm of the quotient of the largest and the smallest particle size is less than or equal to 0.15.

7. Powder clearcoat according to claim 1, wherein the common logarithm of the quotient of the largest and the smallest particle size is less than or equal to 0.20, and in that the average particle size of these powder clearcoat particles is d±0.1 d, where d represents the average layer thickness of the stoved powder clearcoat layer to be prepared using the powder clearcoat, and the average particle size is determined using a laser diffraction spectrometer.

8. Powder clearcoat according to claim 1, wherein the common logarithm of the quotient of the largest and the smallest particle size is less than or equal to 0.15, and in that the average particle size of these powder clearcoat particles is d±0.1 d, where d represents the average layer thickness of the stoved powder clearcoat layer to be prepared using the powder clearcoat, and the average particle size is determined using a laser diffraction spectrometer.

\* \* \* \* \*